(12) United States Patent
Ojima et al.

(10) Patent No.: US 8,511,413 B2
(45) Date of Patent: Aug. 20, 2013

(54) BATTERY INSTALLATION STRUCTURE FOR ELECTRIC AUTOMOBILE

(75) Inventors: Yoshio Ojima, Kariya (JP); Naoya Umeyama, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 13/505,125

(22) PCT Filed: Oct. 29, 2010

(86) PCT No.: PCT/JP2010/069251
§ 371 (c)(1),
(2), (4) Date: Apr. 30, 2012

(87) PCT Pub. No.: WO2011/055687
PCT Pub. Date: May 12, 2011

(65) Prior Publication Data
US 2012/0217077 A1   Aug. 30, 2012

(30) Foreign Application Priority Data
Nov. 6, 2009   (JP) ................................. 2009-254510

(51) Int. Cl.
*B60R 16/04* (2006.01)
(52) U.S. Cl.
USPC ......................................... 180/68.5; 903/907
(58) Field of Classification Search
USPC ............. 180/68.5, 2.1, 65.1, 65.21; 903/903, 903/907, 952; 320/107, 109
See application file for complete search history.

(56) References Cited

U.S. PATENT DOCUMENTS

| 4,087,895 A | * | 5/1978 | Etienne | 29/252 |
| 5,998,963 A | * | 12/1999 | Aarseth | 320/109 |

FOREIGN PATENT DOCUMENTS

| FR | 2946593 A1 | * | 12/2010 |
| JP | 6-262951 A | | 9/1994 |
| JP | 2001-88564 A | | 4/2001 |
| JP | 2003-118397 A | | 4/2003 |

OTHER PUBLICATIONS

Translation of the International Preliminary Report on Patentability for corresponding International Patent Application No. PCT/JP2010/069251 issued on Jun. 12, 2012.
International Search Report for PCT/JP2010/069251 dated Feb. 1, 2011.

* cited by examiner

*Primary Examiner* — John Walters
(74) *Attorney, Agent, or Firm* — Sughrue Mion, PLLC

(57) ABSTRACT

Disclosed is a battery installation structure for an electric automobile. A battery case guide device guides the aforementioned battery case to a battery case housing section. The battery case guide device is provided with protruding parts and guide parts. The protruding parts are provided in an area near the right front corner on the front side surface of the battery case, an area near the right front corner on the right side surface thereof, an area near the left rear corner on the rear side surface thereof, and an area near the left rear corner on the left side surface thereof. The guide parts are provided to the aforementioned automobile body. The guide parts are capable of abutting the protruding parts. Of the two categories of parts mentioned above, namely, the protruding parts and the guide parts, those in one category have each a convex curved surface, and those in the other category have each an inclined surface capable of abutting the convex curved surface.

4 Claims, 10 Drawing Sheets

Fig.3
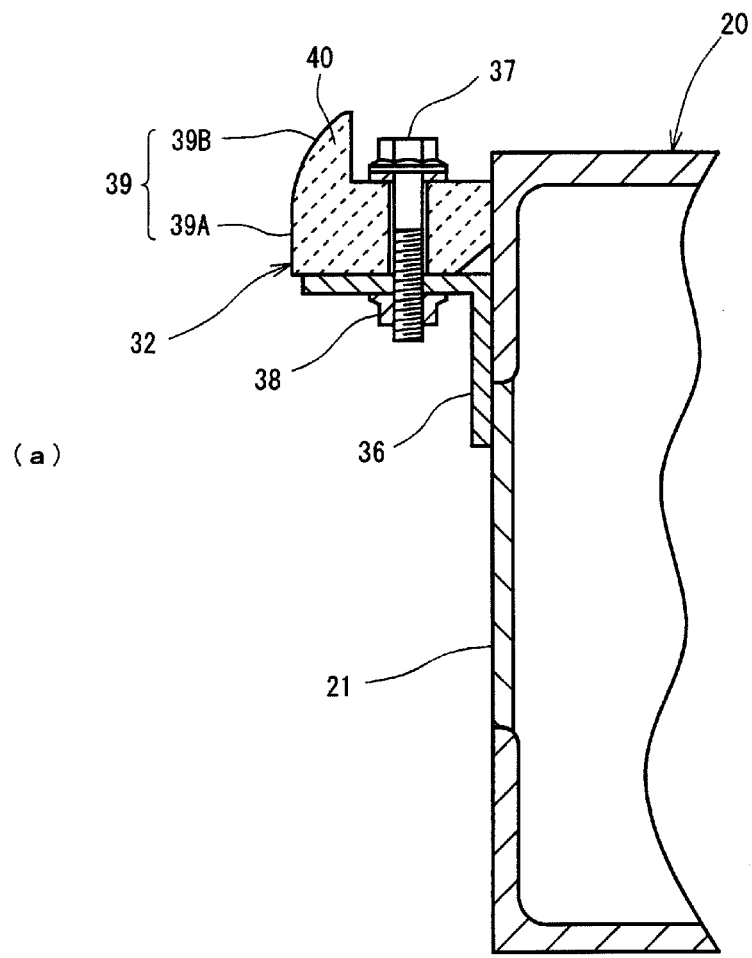
(a)
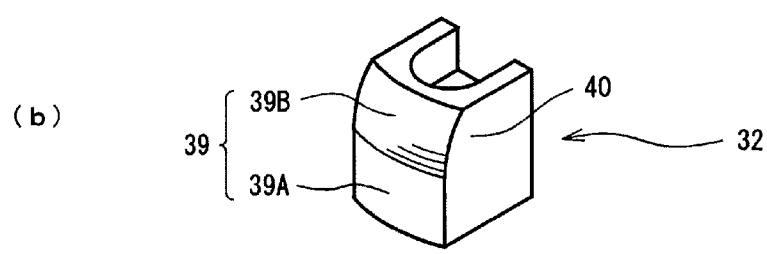
(b)

BATTERY INSTALLATION STRUCTURE FOR ELECTRIC AUTOMOBILE

FIELD OF THE INVENTION

The present invention relates to a battery mounting structure for an electric automobile.

BACKGROUND OF THE INVENTION

Patent document 1 discloses technology related to a battery mounting structure for an electric automobile that implements a battery replacement technique. Document 1 discloses a battery replacement apparatus for an electric automobile. The battery replacement apparatus attaches and detaches a battery unit to and from a holder in a vehicle body from below the electric automobile. The battery replacement apparatus includes a lift unit that is raised and lowered while carrying the battery unit, a position detection unit that detects the position of the holder, and a positioning unit that positions and aligns the battery unit carried on the lift unit with the holder.

Patent document 2 also discloses technology related to a battery mounting structure for an electric automobile. Document 2 discloses a battery coupling structure for a battery device. In the coupling structure, a lock is coupled to a battery holding unit of a vehicle, and a striker, which is held by the lock, is coupled to the battery device. The lock holds the striker to couple the battery device to the holder. Further, the coupling structure includes a loosening prevention unit that prevents loosening of the battery device from the holder.

The loosening prevention unit includes a contact member, which is elastic and arranged on the battery device, and a seat member, which is elastic and coupled to the holder. The contact member is forced against the seat member to prevent loosening of the battery device from the holder. The seat member includes a seat surface that is inclined relative to a coupling direction of the battery device. The contact member includes a contact surface that is substantially parallel to the seat surface. The inclined seat surface and contact surface facilitate the coupling of the battery device to the holder.

PRIOR ART DOCUMENTS

Patent Documents

Patent Document 1: Japanese Laid-Open Patent Publication No. 6-262951
Patent Document 2: Japanese Laid-Open Patent Publication No. 2003-118397

SUMMARY OF THE INVENTION

Problems that are to be Solved by the Invention

However, even when detection of position and positioning are implemented as discussed in document 1, misalignment of from several millimeters to several centimeters occurs. In the coupling structure disclosed in document 2, however, when the battery device is guided to the holder and the battery device and holder are misaligned, the state of contact between the seat surface of the seat member and the contact surface of the contact member changes. This may vary the sliding resistance produced between the seat surface and contact surface. A variation in the sliding resistance between the seat surface and contact surface when the battery device is guided to the holder may vibrate the vehicle body or become the cause of noise.

It is an object of the present invention to provide a battery mounting structure for an electric automobile that guides a battery case to a battery case holder while suppressing the generation of vibration even when misalignment of the battery case and battery holder occurs before the battery case is mounted to the vehicle.

Means for Solving the Problem

A battery mounting structure for an electric automobile including a battery case, a battery case holder, a battery fastening mechanism, and a battery case guiding mechanism is provided. The battery case contains a battery cell. The battery case holder is arranged in a vehicle body of the electric automobile. The battery case holder is capable of accommodating the battery case. The battery fastening mechanism fastens the battery case, which is accommodated in the battery case holder, to the vehicle body. The battery case guiding mechanism guides the battery case to the battery case holder when the battery case is raised from below the vehicle body and accommodated in the battery case holder. The battery case includes four side surfaces facing front, rear, left, and right directions. A first corner is formed by two first side surfaces, among the four side surfaces, intersecting each other at a right angle. A second corner is formed by two remaining second side surfaces, among the four side surfaces, intersecting each other at a right angle. The battery case guiding mechanism includes a case side member and a vehicle body side member. The case side member is arranged at a portion of each of the first side surfaces near the first corner and a portion of each of the second side surfaces near the second corner. The vehicle body side member is arranged on the vehicle body. The vehicle body side member can contact the case side member. One of the case side member and the vehicle side member includes a convex-curved surface, and the other one of the case side member and the vehicle side member includes an inclined surface that can contact the convex-curved surface.

Here, the convex-curved surface refers to a convex curved surface that comes into line contact or point contact with a flat surface and includes, for example, a spherical surface, an arcuate surface, and an elliptical surface. Further, the phrase of near a corner on each side surface refers to a portion of each side surface closer to a corner than a middle part.

In the present invention, even if misalignment occurs between the battery case, prior to mounting, and the battery case holder, when the case side member and vehicle body side member slide relative to each other as the battery case is guided, the state of contact between the convex-curved surface and tapered surface subtly changes, and the sliding resistance between the convex-curved surface and tapered surface subtly varies as compared with the prior art. Accordingly, even when misalignment occurs between the battery case and the battery case holder of the vehicle before mounting the battery case, the generation of vibration is suppressed when the battery case is guided to the battery case holder.

Preferably, the convex-curved surface is formed by a spherical surface.

Accordingly, the contact of the convex-curved surface, which is formed by a spherical surface, and tapered surface is always point contact. Thus, even when tilting of the battery case and battery case holder causes misalignment, the sliding resistance between the convex-curved surface and tapered surface subtly varies.

Preferably, the convex-curved surface is formed by an arcuate surface.

Accordingly, the contact of the convex-curved surface, which is formed by an arcuate surface, and tapered surface is always line contact. When misalignment occurs due to tilting of the battery case and the battery case holder in a specific direction that maintains the convex-curved surface and tapered surface in line contact, the sliding resistance between the convex-curved surface and tapered surface subtly varies.

Preferably, the battery case is tetragonal when viewed from above, and the first corner and the second corner are located at diagonal positions.

Accordingly, the battery case, which is tetragonal when viewed from above, is positioned at the first corner and second corner, which are most separated. Thus, the battery case is positioned relative to the battery case holder with high accuracy.

BRIEF DESCRIPTION OF THE DRAWINGS

FIG. 3(a) is a cross-sectional view taken along line 3-3 in FIG. 2, and FIG. 3(b) is a perspective view showing a front projection.

DETAILED DESCRIPTION OF THE PREFERRED EMBODIMENTS

A battery mounting structure for an electric automobile according to a first embodiment of the present invention will now be described with reference to the drawings. In the present embodiment, an electric automobile 10 implements a battery replacement technique and uses battery cells C in a battery case 20, which is attachable and detachable, as a drive source. When the battery cells C need to be charged, the battery case 20 is removed from a battery case holder 44 of the electric automobile 10 at a battery replacement station 11 and a different battery case 20, which accommodates charged battery cells C, is mounted on the battery case holder 44.

Figure 1:
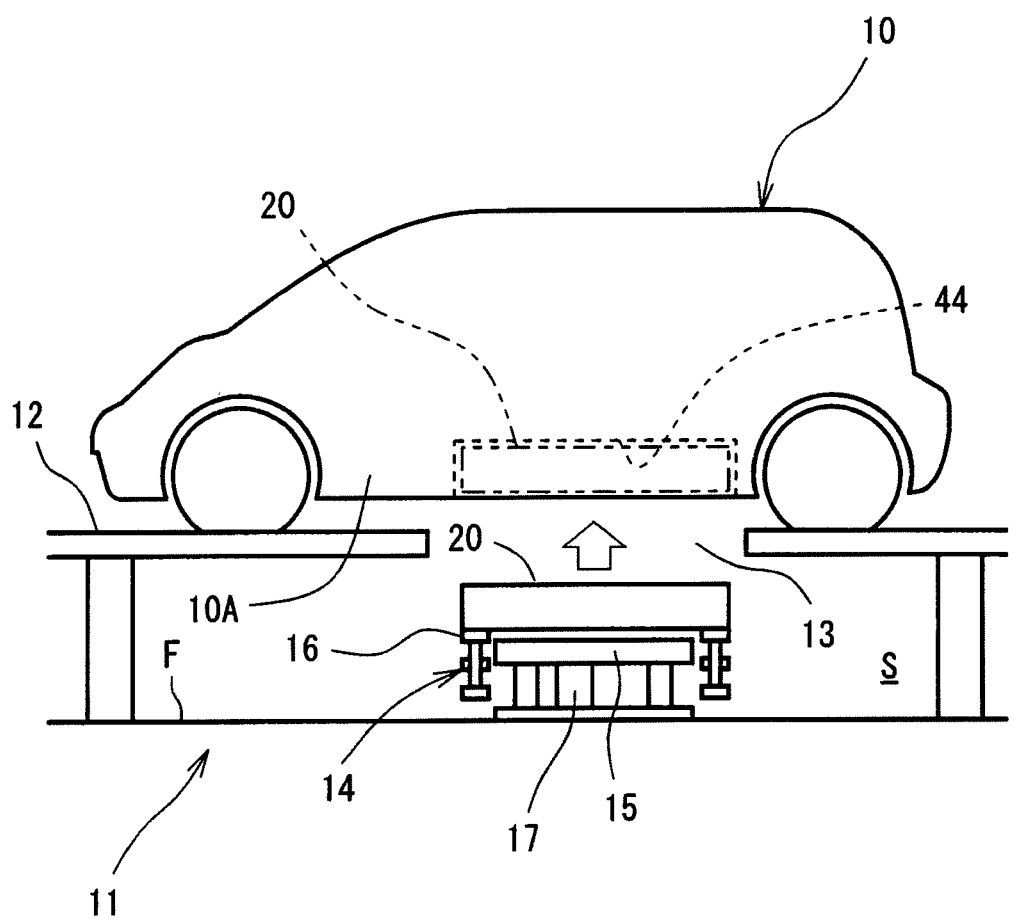
FIG. 1 is a side view showing battery replacement in an electric automobile according to a first embodiment of the present invention.

FIG. 1 shows a battery replacement station 11, which is for replacing the battery case 20 of the electric automobile 10. The battery replacement station 11 includes a parking pit 12, in which the electric automobile 10 is parked, and a battery replacer 14, which is set on a floor F in a space S under the parking pit 12. The parking pit 12 includes an opening 13, which is in communication with the space S. The opening 13 has a shape and size that allows for passage of the battery case 20. The battery replacer 14 includes a platform 15, on which the battery case 20 is placed, a conveyor 16, which conveys the battery case 20 between the platform 15 and a location separated from the platform 15, and a lift 17, which raises and lowers the platform 15 in the vertical direction.

Figure 2:
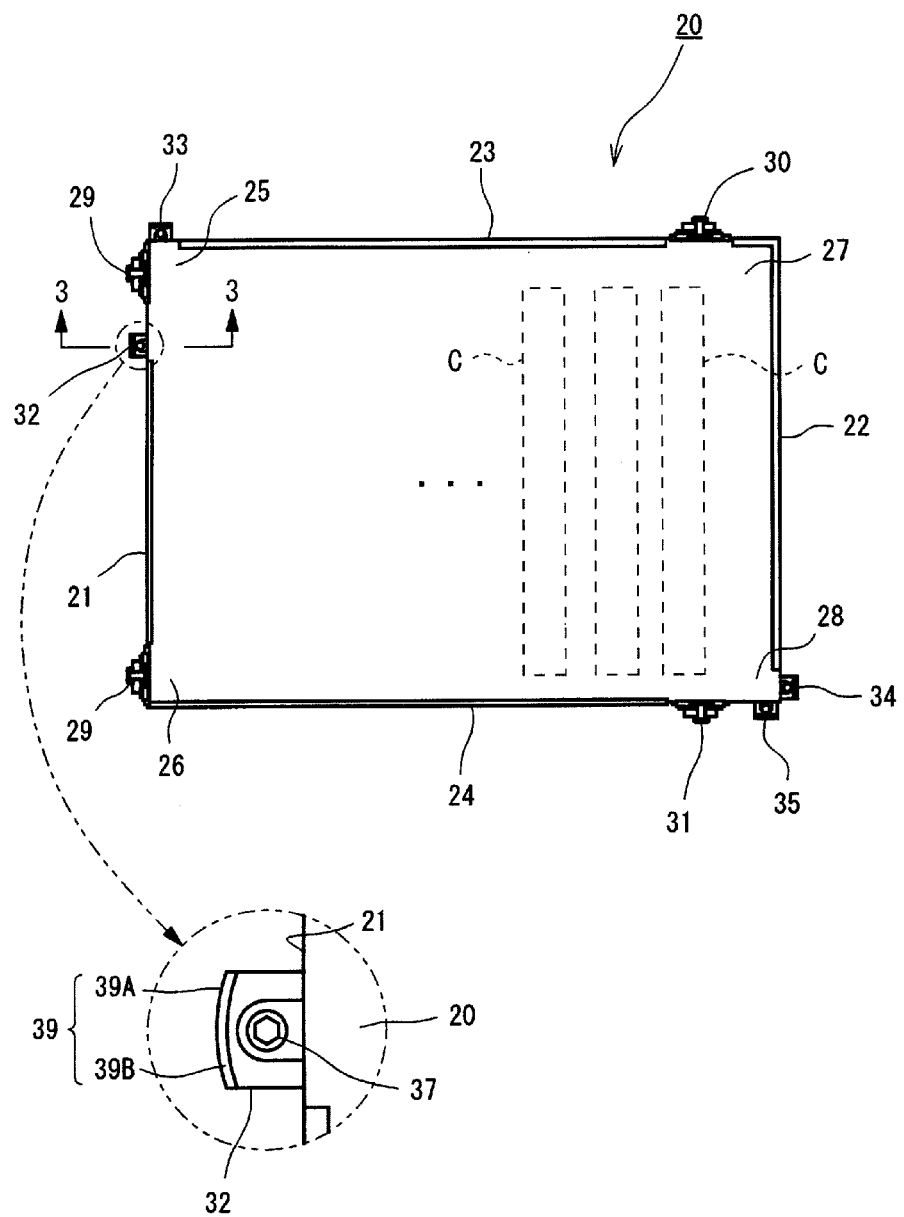
FIG. 2 is a plan view of a battery case in the first embodiment of the present invention.

The battery case 20 of the present embodiment is tetragonal when viewed from above as shown in FIG. 2 and has four side surfaces in the front, rear, left, and right directions. The battery case 20 contains a large number of battery cells C. The battery case 20 includes a connector (not shown), which outputs power from the charged battery cells C and inputs regenerative power. With regard to the four side surfaces of the battery case 20, the side surface facing toward the front side of the electric automobile 10 is defined as a front surface 21 (first side surface), the side surface facing toward the rear side of the electric automobile 10 is defined as a rear surface 22 (second side surface), the side surface facing toward the right side of the electric automobile 10 is defined as a right surface 23 (first side surface), and the side surface facing toward the left side of the electric automobile 10 is defined as a left surface 24 (second side surface).

The battery case 20 includes four corners. The four corners are a right front corner 25, which is formed where the front surface 21 and the right surface 23 intersect each other at a right angle, a left front corner 26, which is formed where the front surface 21 and the left surface 24 intersect each other at a right angle, a right rear corner 27, which is formed where the rear surface 22 and the right surface 23 intersect each other at a right angle, and a left rear corner 28, which is formed where the rear surface 22 and the left surface 24 intersect each other. In the present embodiment, the right front corner 25 corresponds to a first corner, and the left rear corner 28 corresponds to a second corner. The right front corner 25 and left rear corner 28 are located at diagonal positions.

A front striker 29, which projects in an orthogonal direction (frontward) from the front surface 21, is arranged on the front surface 21 at a portion near the right front corner 25 and a portion near the left front corner 26. A right striker 30, which projects in an orthogonal direction (rightward) from the right surface 23, is arranged on the right surface 23. A left striker 31, which projects in an orthogonal direction (leftward) from the left surface 24, is arranged on the left surface 24. The strikers 29 to 31 form part of a battery fastening mechanism that fastens the battery case 20 to the electric automobile 10.

A front projection 32, which serves as a case side member of a battery case guiding mechanism, is arranged on the front surface 21 near the right front corner 25 at the left side of the front striker 29. A right projection 33, which serves as a case side member of the battery case guiding mechanism, is arranged on a portion of the right surface 23 near the right front corner 25. The front projection 32 and right projection 33 are projections arranged at portions near the right front corner 25 on the side surfaces 21 and 23 that form the right front corner 25. Further, a rear projection 34, which serves as a case side member of the battery case guiding mechanism, is arranged on a portion of the rear surface 22 near the left rear corner 28. A left projection 35, which serves as a case side member of the battery case guiding mechanism, is arranged on a portion of the left surface 24 near the left rear corner 28. The rear projection 34 and left projection 35 are projections arranged at portions near the left rear corner 28 on the side surfaces 22 and 24 that form the left rear corner 28

The front projection 32, right projection 33, rear projection 34, and left projection 35 basically have the same structure. Here, only the front projection 32 will be described, and the right projection 33, rear projection 34, and left projection 35 will not be described. As shown in FIG. 3(a), the front projection 32 is fixed by a bolt 37 and nut 38 to a support plate 36, which is fixed to the front surface 21 of the battery case 20 and has an L-shaped cross-section. The front projection 32 is formed from a hard resin, for example, a nylon hard resin. The formation of the front projection 32 from a hard resin improves the sliding capability of the front projection 32 relative to a vehicle body 10A during replacement of the battery case 20 and suppresses the generation of noise when the front projection 32 slides along the vehicle body 10A.

As shown in FIGS. 3(a) and 3(b), the front projection 32 includes a distal surface 39. The distal surface 39 includes a lower end surface 39A and an upper end surface 39B. The lower end surface 39A is a curved vertical surface that is curved in the horizontal direction. The upper end surface 39B is defined by a convex-curved surface. In the present embodiment, the convex-curved surface is formed by a spherical surface. Thus, when cutting the convex-curved surface in the vertical direction or horizontal direction, the cut convex-curved surface is always arcuate. Further, in the front projection 32, an upper portion 40, which corresponds to the upper end surface 39B, has an upper end that projects upward from an upper surface of the battery case 20. Since the upper end of the upper portion 40 projects upward from the upper surface of the battery case 20, the battery case 20 is prevented from directly interfering with the vehicle body 10A when raising and accommodating the battery case 20 in a battery case holder 44.

Figure 4:
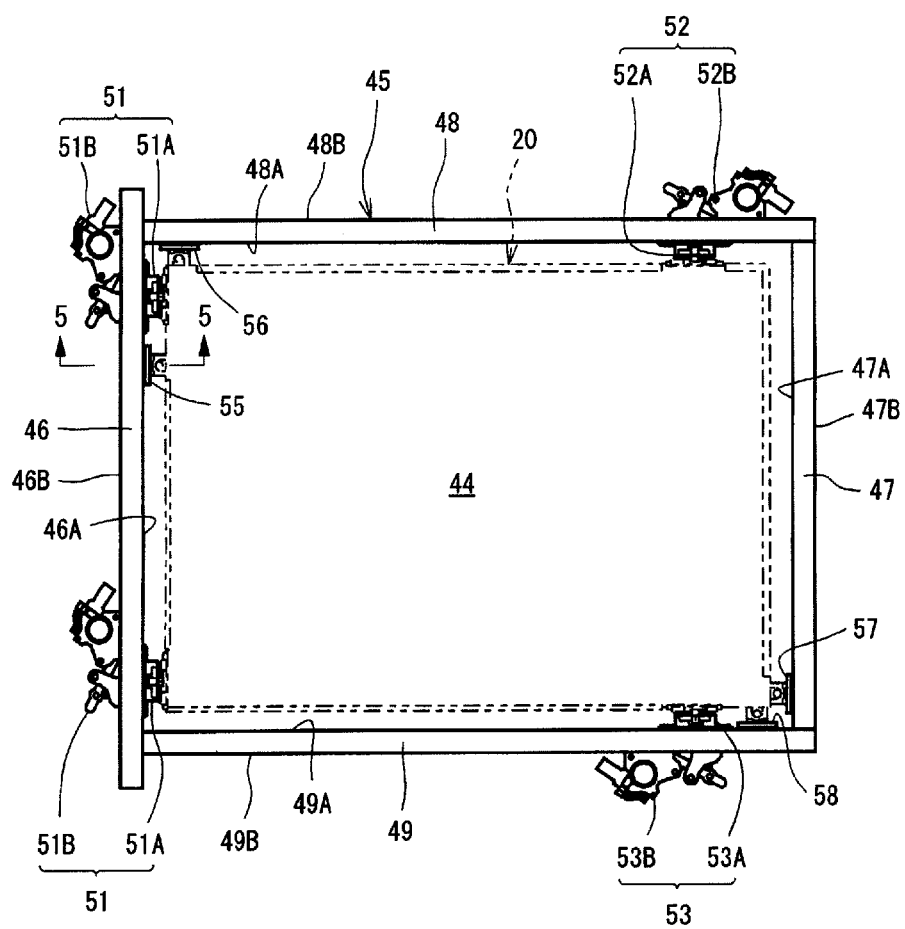
FIG. 4 is a plan view showing a battery case holder in the first embodiment of the present invention.

The battery case holder 44 of the electric automobile 10 will now be described. As shown in FIG. 1, the battery case holder 44, which includes a void that accommodates the battery case 20, is formed in a lower portion of the vehicle body 10A of the electric automobile 10. As shown in FIG. 4, the battery case holder 44 is defined by a tetragonal frame 45 arranged in the vehicle body 10A. The tetragonal frame 45 includes a front frame segment 46, a rear frame segment 47, a right frame segment 48, and a left frame segment 49. A front latch mechanism 51 is arranged near each of the two ends of the front frame segment 46. The front latch mechanism 51 includes a latch 51A, which is engaged with the front striker 29 of the battery case 20, and a drive unit 51B, which locks (fixes) the latch 51A in engagement with the front striker 29 or forcibly disengages the latch 51A from the front striker 29. The latch 51A is arranged on an inner surface 46A of the front frame segment 46 that faces the battery case holder 44. The drive unit 51B is arranged on an outer surface 46B of the front frame segment 46.

A right latch mechanism 52 is arranged on the right frame segment 48. The right latch mechanism 52 includes a latch 52A, which is engaged with the right striker 30 of the battery case 20, and a drive unit 52B, which locks (fixes) the latch 52A in engagement with the right striker 30 or forcibly disengages the latch 52A from the right striker 30. The latch 52A is arranged on an inner surface 48A of the right frame segment 48 that faces the battery case holder 44. The drive unit 52B is arranged on an outer surface 48B of the right frame segment 48. A left latch mechanism 53 is arranged on the left frame segment 49. The left latch mechanism 53 includes a latch 53A, which is engaged with the left striker 31 of the battery case 20, and a drive unit 53B, which locks (fixes) the latch 53A in engagement with the left striker 31 or forcibly disengages the latch 53A from the left striker 31. The latch 53A is arranged on an inner surface 49A of the left frame segment 49B that faces the battery case holder 44. The drive unit 53B is arranged on an outer surface 49B of the left frame segment 49. The latch mechanisms 51 to 53 form the battery fastening mechanism together with the strikers 29 to 31.

A front guide 55, which serves as a vehicle body side member of the battery case guiding mechanism, is arranged on the inner surface 46A of the front frame segment 46. A right guide 56, which serves as a vehicle body side member of the battery case guiding mechanism, is arranged on the inner surface 48A of the right frame segment 48. The front guide 55 and the right guide 56 are members that can respectively contact the front projection 32 and right projection 33, which are arranged at portions near the right front corner 25 on the side surfaces 21 and 23 forming the right front corner 25 of the battery case 20. Further, a rear guide 57, which serves as a vehicle body side member of the battery case guiding mechanism, is arranged on an inner surface 47A of the rear frame segment 47. A left guide 58, which serves as a vehicle body side member of the battery case guiding mechanism, is arranged on an inner surface 49A of the left frame segment 49. The rear guide 57 and the left guide 58 are members that can respectively contact the rear projection 34 and left projection 35, which are arranged at portions near the left rear corner 28 on the side surfaces 22 and 24 forming the left rear corner 28 of the battery case 20.

Figure 5:
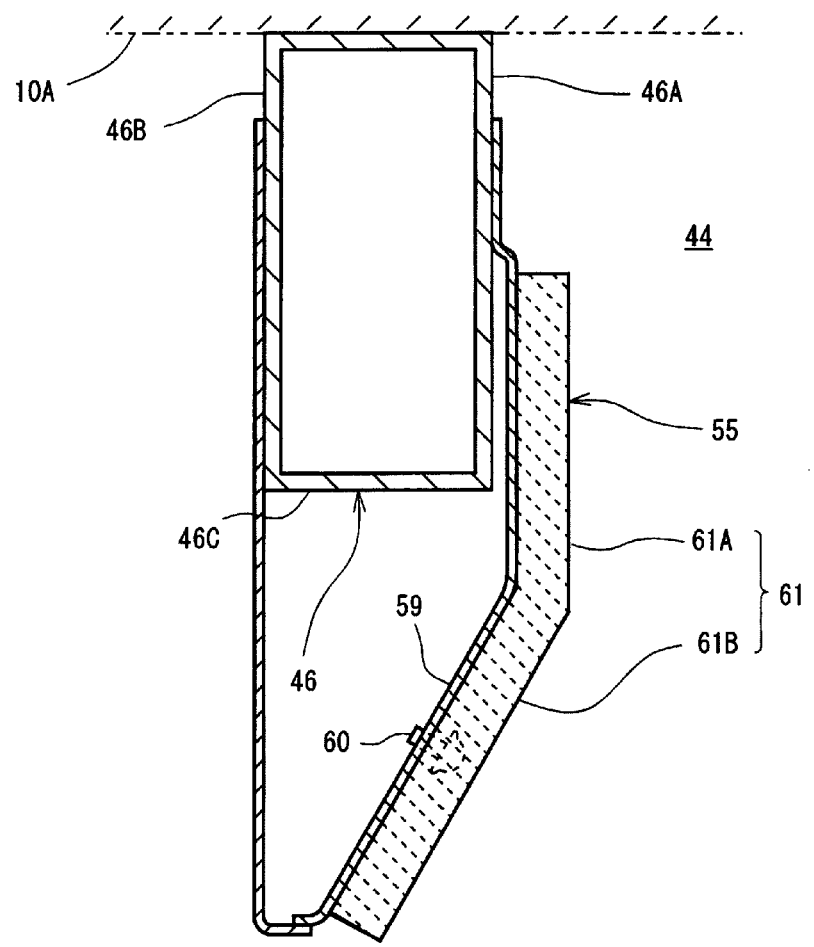
FIG. 5 is a cross-sectional view taken along line 5-5 in FIG. 4.

The front guide 55, right guide 56, rear guide 57, and left guide 58 of the present embodiment basically have the same structure. Here, only the front guide 55 will be described, and the right guide 56, rear guide 57, and left guide 58 will not be described. As shown in FIG. 5, the front guide 55 is fixed by a bolt 60 to a support plate 59, which is fixed to the inner surface 46A and outer surface 46B of the front frame segment 46 and has a wedge-shaped cross-section. The front guide 55 is formed from a hard resin. This improves the sliding capability of the front projection 32 during replacement of the battery case 20 and suppresses the generation of noise when sliding the front projection 32.

The front guide 55 includes an inner surface 61, which faces the battery case holder 44. The inner surface 61 includes an upper inner surface 61A, and a lower inner surface 61B. The upper inner surface 61A is a vertical surface, and the lower inner surface 61B is an inclined surface inclined outward from the front frame segment 46. The vertical surface 61A extends further downward than a bottom surface 46C of the front frame segment 46. The inclined surface 61B, which extends continuously from the vertical surface 61A, is inclined so as to be located further outward from the front frame body at downward positions. The front guide 55 has a lower end located between the inner surface 46A and the outer surface 46B (more specifically, near the outer surface 46B) below the bottom surface 46C of the front frame segment 46. The inclined surface 61B and vertical surface 61A of the front guide 55 contact the front projection 32 during replacement of the battery case 20.

In this manner, the battery mounting structure of the present embodiment includes the battery case 20, the battery case holder 44, the battery fastening mechanism (strikers 29 to 31 and latch mechanisms 51 to 53), and the battery case guiding mechanism (projections 32 to 35 and guides 55 to 58). The projections 32 and 34 and the corresponding guides 55 and 57 are elements for positioning the battery case 20 in the front to rear direction. The projections 33 and 35 are elements for positioning the battery case 20 in the left to right direction.

The procedures for mounting the battery case 20 onto the electric automobile 10 will now be described. The electric automobile 10 is parked on the parking pit 12 of the battery replacement station 11. Here, the vehicle body 10A is positioned relative to the parking pit 12 so that the battery case holder 44 faces the opening 13. The battery case 20 with battery cells C of which power has mostly been consumed is removed from the battery case holder 44 and the battery case holder 44 becomes empty. A battery case 20 that is to be mounted is conveyed by the conveyor 16 and placed beforehand on the platform 15 of the battery replacer 14. Then, the lift 17 is actuated to raise the platform 15 and move the battery case 20 toward the battery case holder 44 of the vehicle body 10A. The battery case 20 is continuously raised to accommodate the battery case 20 in the battery case holder 44. When the battery case 20 is normally accommodated in the battery case holder 44, the strikers 29 to 31 are engaged with the corresponding latch mechanisms 51 to 53. Then, the drive units 51B to 53B are driven to lock the latches 51A to 53A. This holds the corresponding strikers 29 to 31 in a state inseparable from the latch mechanisms 51 to 53.

The electric automobile 10 may be parked in the parking pit 12 in a state in which its tires are in contact with positioning members (not shown). However, due to the air pressure of a tire or variations in the orientation of the tires, a slight misalignment may occur between the battery case 20 and the battery case holder 44. When misalignment of the battery case 20 and battery case holder 44 occurs, the battery case 20 and battery case holder 44 may be misaligned in the front to rear direction and the left to right direction. When such misalignment occurs, the contact between the projections 32 to 35 and the corresponding guides 55 to 58 and the guiding of the projections 32 to 35 with the guides 55 to 58 resolve the misalignment of the battery case 20 in the front to rear direction and left to right direction relative to the battery case holder 44 when the battery case 20 is raised.

Figure 6:
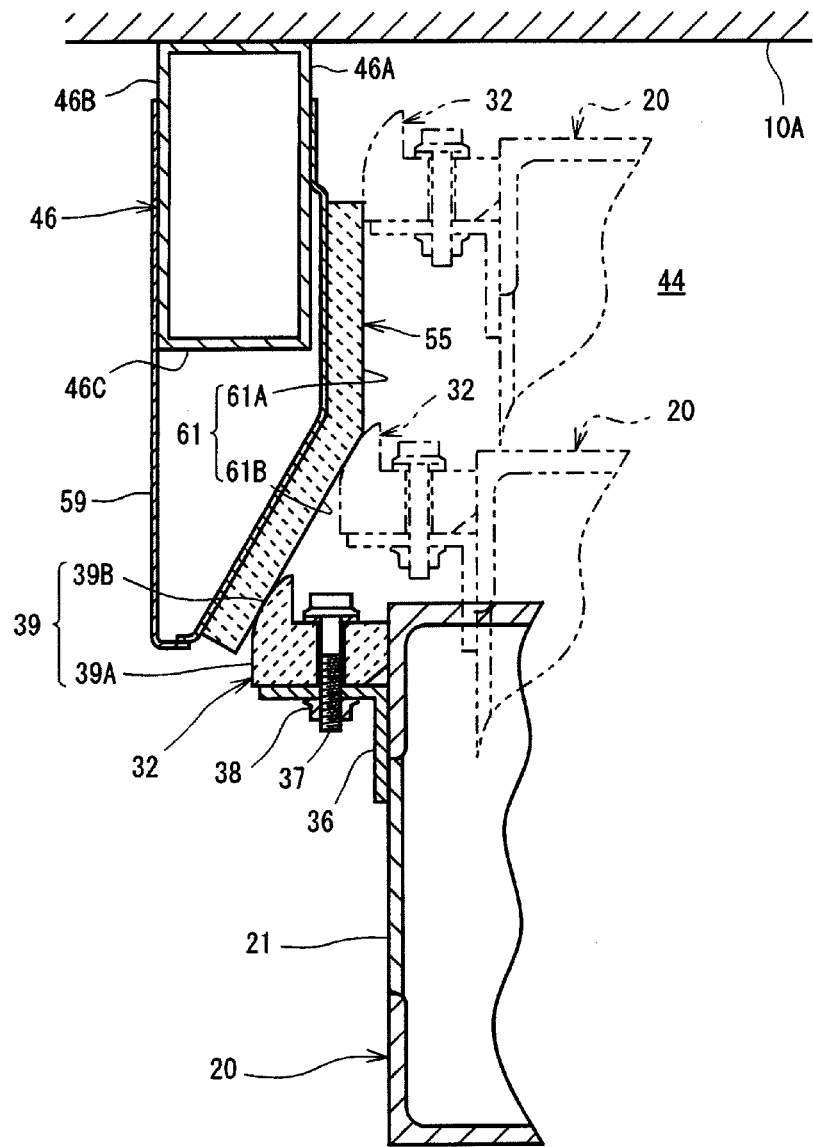
FIG. 6 is a cutaway partial view illustrating the guiding of the battery case when misaligned.

For example, as shown in FIG. 6, when the battery case 20 is located slightly frontward from a position optimal for accommodation (optimal position) relative to the battery case holder 44, as the battery case 20 rises, the upper end surface 39B of the front projection 32 comes into point contact with the lower inner surface 61B of the front guide 55. As the battery case 20 continues to rise, the projection 32 rises while sliding along the lower inner surface 61B of the front guide 55. The front projection 32 is guided along the lower inner surface 61B. This moves the case 20 toward the rear as it rises. In this state, even when the battery case 20 is inclined relative to the horizontal direction, there is no change in the state of contact between the upper end surface 39B, which is a convex-curved surface, and the lower inner surface 61B, which is an inclined planar surface. Thus, when the battery case 20 is guided to the battery case holder 44, the sliding resistance between the front projection 32 and front guide 55 subtly varies.

As the battery case 20 continues to rise and the front projection 32 reaches the upper inner surface 61A of the front guide 55, the battery case 20 is guided to a position in which it can be accommodated in the battery case holder 44, as shown by the double-dashed line in FIG. 4. In this state, the guides 55 to 58 impose restrictions with the projections 32 to 35 on the battery case 20. This positions the battery case 20 in the front, rear, left, and right directions relative to the battery case holder 44. As the battery case 20 further rises, the battery case 20 becomes accommodated in the battery case holder 44. When the battery case 20 is accommodated in the battery case holder 44, the latch mechanisms 51 to 53 hold the corresponding strikers 29 to 31, and the battery case 20 is fastened to the vehicle body 10A.

When the battery case 20 is located slightly rearward from the optimal position, the contact of the rear projection 34 with the rear guide 57 and the guiding of the rear projection 34 with the rear guide 57 resolves the misalignment. When the battery case 20 is located slightly rightward or leftward from the optimal position, the contact of the right projection 33 with the right guide 56 and the guiding of the right projection 33 with the right guide 56 or the contact of the left projection 35 with the left guide 58 and the guiding of the left projection 35 with the left guide 58 resolves the misalignment.

The battery case 20 may be misaligned relative to the battery case holder 44 in both of the front to rear direction and the left to right direction. In this case, the misalignment in the front to rear direction and the misalignment in the left to right direction are simultaneously resolved when the projections 32 to 34 contact the corresponding guides 55 to 58 and are guided along the guides 55 to 58.

In addition to misalignment of the battery case 20 and battery case holder 44 in the front to rear direction and left to right direction, misalignment may occur when one of the battery case 20 and battery case holder 44 is inclined relative to the other one. Such misalignment of the battery case 20 occurs, for example, when the vehicle body 10A is tilted upward or downward relative to the front to rear direction or left to right direction or when the orientation of the vehicle body 10A in a parked state is deviated from the proper orientation. In the same manner as described above, even if such misalignment occurs, when the battery case 20 rises, the projections 32 to 35 are guided while sliding along the corresponding guides 55 to 58. This corrects the battery case 20 to the proper position.

Figure 7:
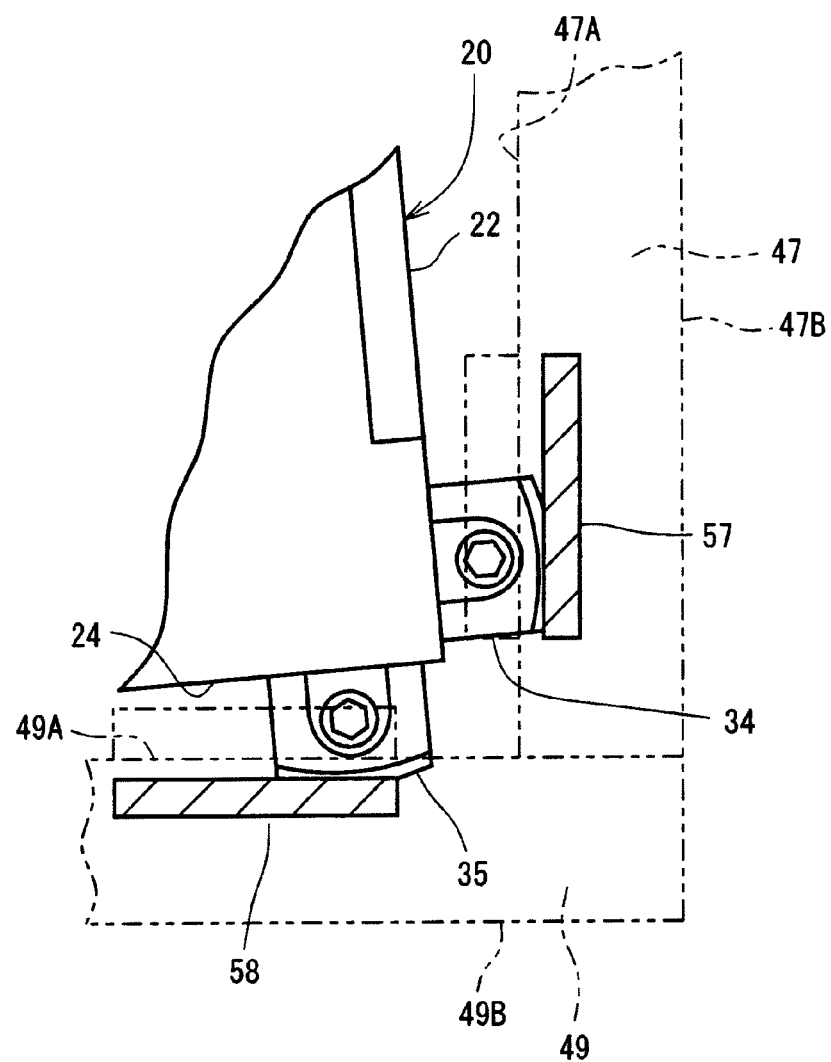
FIG. 7 is a partial plane view showing the contact of the battery case, which is tilted and thereby misaligned, and a guide.

For instance, in the example shown in FIG. 7, the battery case 20 is tilted relative to the battery case holder 44 and thereby misaligned. As a result, the rear projection 34 contacts the rear guide 57, and the left projection 35 contacts the left guide 58. In this case, each convex-curved surface is formed by a spherical surface in the rear projection 34 and the left projection 35. Thus, the convex-curved surface of the rear projection 34 comes into point contact with the inclined surface of the rear guide 57, and the convex-cured surface of the left projection 35 comes into point contact with the inclined surface of the left guide 58.

In the case of FIG. 7, as the battery case 20 further rises, the rear projection 34 is guided while sliding along the inclined surface of the rear guide 57, and the left projection 35 is guided while sliding along the inclined surface of the left guide 58. The guiding of the rear guide 57 along the inclined surface of the rear projection 34 and the guiding of the guide 58 along the inclined surface of the left projection 35 corrects the tilting of the battery case 20 relative to the battery case holder 44. Even if the position of the battery case 20 is corrected, that is, even if the position of the battery case 20 relative to the battery case holder 44 changes, the convex-curved surface of each of the projections 34 and 35 are formed by spherical surfaces. Thus, the state of point contact between the convex-curved surface of each of the projections 34 and 35 and the corresponding tapered surface basically does not change. Thus, even if the position of the battery case 20 changes when guided, the sliding resistances between the projections 34 and 35 and the corresponding guides 57 and 58 are not significantly varied.

Even when the battery case 20 and battery case holder 44 are misaligned due to tilting in the horizontal direction, the projections 32 to 35 are guided while sliding along the inclined surfaces of the corresponding guides 55 to 58 to correct the position of the battery case 20. In this case, the state of contact between the convex-curved surface and inclined surface also does not basically change, and the sliding resistances between the projections 32 to 35 and the corresponding guides 55 and 58 are also subtly varied.

The present embodiment has the advantages described below.

(1) Even when misalignment occurs between the battery case 20, which is placed on the platform 15, and the battery case holder 44, which is arranged in the vehicle body 10A, the convex-curved surfaces of the projections 32 to 35 is always in point contact with the inclined surfaces (guide surfaces) of the corresponding guides 55 to 58 when the battery case 20 is being guided to the battery case holder 44. This suppresses vibration in the sliding resistance between the convex-curved surfaces and the inclined surfaces in comparison with the prior art. Accordingly, even when a misalignment occurs between the battery case 20 and the battery case holder 44, which is arranged in the vehicle body 10A, the generation of vibration and noise caused by the misalignment can be suppressed.

(2) The front projection 32 and the right projection 33 are located at portions of the battery case 20 near the right front corner 25. Thus, the front projection 32 and the right projection 33, which are orthogonal to each other at the right front corner 25, are proximal to each other.

Further, the rear projection 34 and the left projection 35 are located at portions of the battery case 20 near the left rear corner 28. Thus, the rear projection 34 and the left projection 35, which are orthogonal to each other at the left rear corner 28, are proximal to each other. In addition to the right front corner 25 and left rear corner 28 being located at diagonal positions, the projections 32 to 35 are guided by the corresponding guides 55 to 58. This positions the battery case 20 relative to the battery case holder 44 with high accuracy.

(3) The convex-curved surfaces of the projections 32 to 35 and the inclined surfaces of the guides 55 to 58 are in a state of point contact. Thus, variation in the sliding resistance between the convex-curved surface and the inclined surface is decreased in comparison with the prior art regardless of the direction the battery case 20 is tilted in and misaligned relative to the vehicle body 10A.

(4) The four projections 32 to 35 of the battery case 20 and the four guides 55 to 58, which correspond to the projections 32 to 35, form the battery case guiding mechanism. This reduces the number of components of the battery case guiding mechanism. The reduction in the number of components of the battery case guiding mechanism reduces the manufacturing cost and weight of the battery mounting structure.

(5) The projections 32 to 35 and the corresponding guides 55 to 58 are each formed from a hard resin. Thus, the sliding is satisfactory between the projections 32 to 35 and the guides 55 to 58, and the battery case 20 can stably be guided to the battery case holder 44. Further, during sliding of the projections 32 to 35 and the guides 55 to 58, the generation of vibration and noise can be suppressed.

A battery mounting structure according to a second embodiment of the present invention will now be described. The present embodiment differs from the first embodiment in that the guides 55 to 58 are arranged as case side members on the battery case 20 and the projections 32 to 35 are arranged as vehicle side members on the tetragonal frame 45. In the present embodiment, same reference numerals are given to those components that are the same as the corresponding components of the first embodiment. Such components will not be described.

Figure 8:
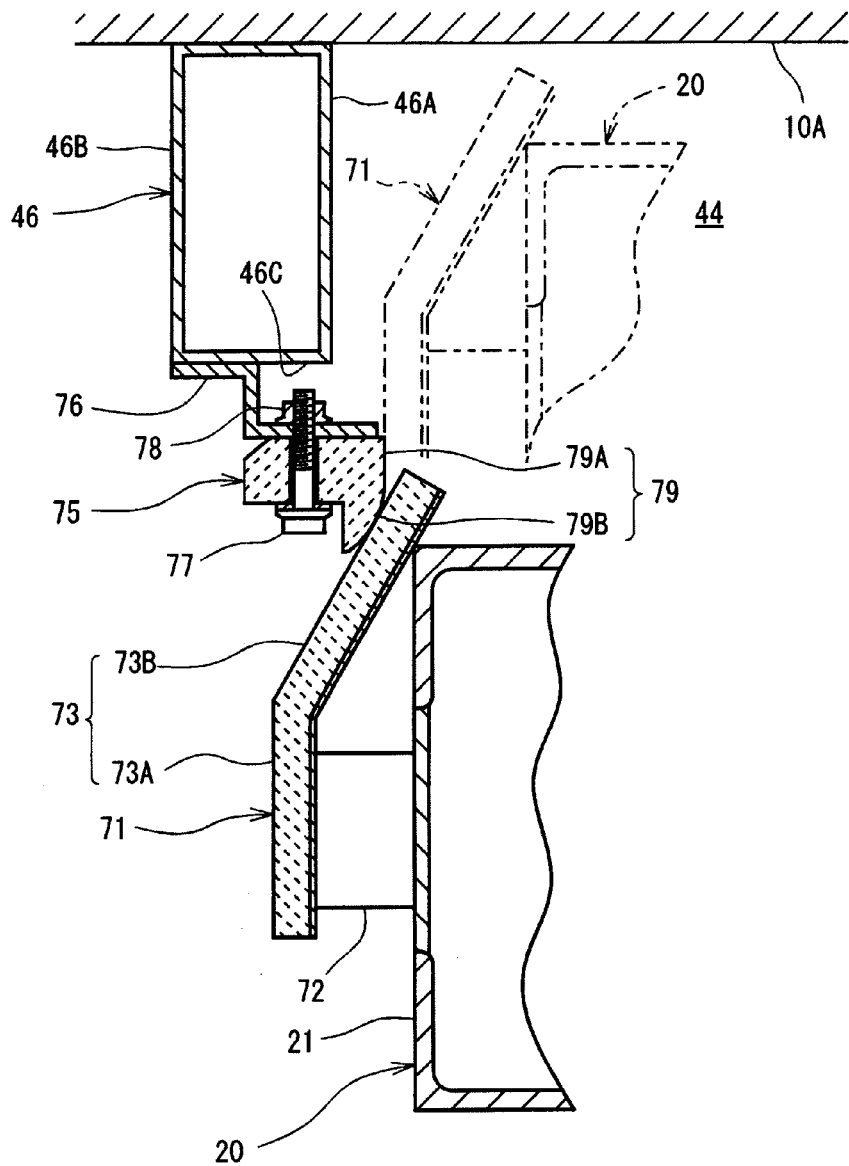
FIG. 8 is a partial cutaway view showing a battery guiding mechanism in a second embodiment of the present invention.

The battery case 20 of the battery mounting structure in the present embodiment includes four side surfaces in the front, rear, left, and right directions and four corners (right front corner, left front corner, right rear corner, and left rear corner). The battery case 20 includes strikers (not shown) having the same structure as the first embodiment. As shown in FIG. 8, which is a cutaway view showing a main part of a battery guiding mechanism in the second embodiment, a front guide 71 is arranged on the front surface 21 of the battery case 20, and a front projection 75 is arranged to project rearward from the inner surface 46A of the front frame segment 46.

The front guide 71, which serves as a case side member of the battery case guiding mechanism, is arranged at a portion near the right front corner 25 of the front surface 21 of the battery case 20. As shown in FIG. 8, the front guide 71 is fixed by a bolt (not shown) to a support plate 72, which is arranged on the front surface 21 of the battery case 20. The front guide 71 is formed from a hard resin.

An outer surface 73, which is the front surface of the front guide 71, includes a lower outer surface 73A and an upper outer surface 73B. The lower outer surface 73A is a vertical surface. The upper outer surface 73B is defined by an inclined surface, which is inclined toward the battery case 20. The front guide 71 includes an upper end extending upward from an upper surface of the battery case 20, and the inclined surface extends rearward from the front surface 21 of the battery case 20. Since the upper end of the front guide 71 projects upward from the upper surface of the battery case 20, when raising the battery case 20, direct interference between the battery case 20 and the vehicle body 10A is suppressed. The inclined surface 73B and vertical surface 73A of the front guide 71 contact the front projection 75 of the vehicle body 10A when replacing the battery case 20. Although not shown in the drawings, in the battery case 20, a right guide is arranged on a portion of the right surface 23 near the right front corner 25, a rear guide is arranged on a portion of the rear surface 22 near the left rear corner 28, and a left guide is arranged on a portion of the left surface 24 near the left rear corner 28. These guides, which serve as case side members, have the same structure as the front guide 71.

The bottom surface 46C of the front frame segment 46 is fixed to a support plate 76, which is bent to be crank-shaped. The front projection 75 is fixed by a bolt 77 and nut 78 to the support plate 76. In the support plate 76, the portion contacting the bottom surface 56C of the front frame segment 46 and the portion contacting the front projection 75 are separated in the front to rear direction so as not to face each other. The front projection 75 is formed from a hard resin. The front projection 75 includes a distal surface 79, which is the surface that faces the battery case 20. The distal surface 79 includes an upper end surface 79A and a lower end surface 79B. The upper end surface 79A is a curved vertical surface, and the lower end surface 79B is defined by a convex-curved surface. The convex-curved surface is formed by a spherical surface. Thus, when cutting the convex-curved surface in the vertical direction or horizontal direction, the cut convex-curved surface is always arcuate. Although not shown in the drawings, projections respectively corresponding to the right guide, rear guide, and left guide are provided as vehicle side members. These projections have the same structure as the projections 75.

In the present embodiment, even if the battery case 20 is misaligned with the battery case holder 44 in the front, rear, left, or right directions or misaligned with the battery case holder 44 due to tilting, when the guides of the battery case 20 slide along the inclined surfaces of the projections of the vehicle body 10A and are guided, the state of contact between the convex-curved surfaces and the inclined surfaces basically does not change. Further, the sliding resistance between the projections and the corresponding guides does not significantly vary. Accordingly, the present invention has substantially the same advantages as the first embodiment.

A battery mounting structure according to a third embodiment of the present invention will now be described. The third embodiment differs from the first and second embodiments in that a battery case 80 includes a cutout portion 85 and in that the battery case 80 is not tetragonal when viewed from above. In the present invention, same reference numerals are given to those components that are the same as the corresponding components of the first embodiment. Such components will not be described.

Figure 9:
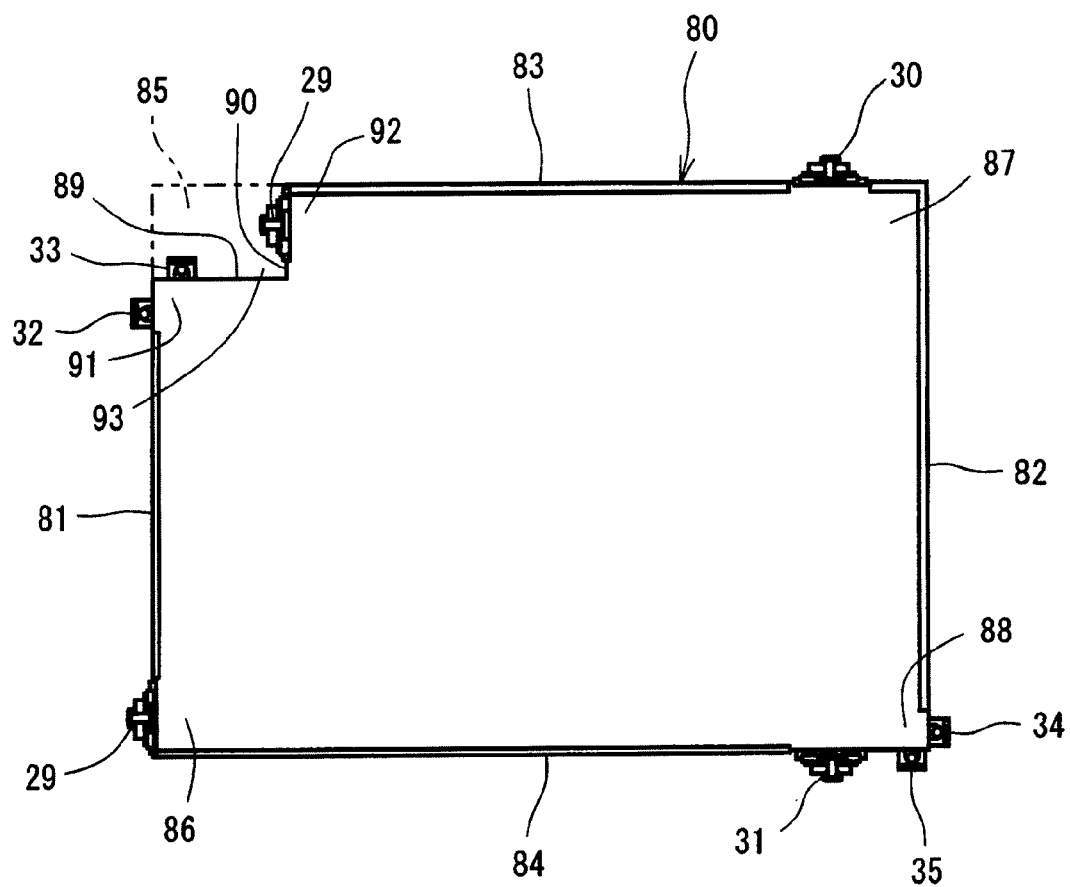
FIG. 9 is a plan view showing a battery case in a third embodiment of the present invention.

FIG. 9 is a plan view showing the battery case 80 of the present embodiment. The battery case 80 shown in FIG. 9 includes the tetragonal cutout portion 85 in the right front corner. In addition to a front surface 81, a rear surface 82, a right surface 83, and a left surface 84, the battery case 80 includes a cutout right surface 89 and a cutout front surface 90. The cutout right surface 89 and cutout front surface 90 define the cutout portion 85. The cutout right surface 89 and right surface 83 are parallel planes, and the cutout front surface 90 and front surface 81 are parallel surfaces. Thus, the cutout front surface 90 and the cutout right surface 89 intersect each other at a right angle.

The battery case 80 includes a left front corner 86, which is formed where the front surface 81 and the left surface 84 intersect each other at a right angle, a right rear corner 87, which is formed where the rear surface 82 and the right surface 83 intersect each other at a right angle, and a left rear corner 88, which is formed where the rear surface 82 and the left surface 84 intersect each other. Since the battery case 80 includes the cutout portion 85, the right front corner of the battery case 80 includes a cutout front corner 91, which is defined by the front surface 81 and the cutout right surface 89, a cutout right corner 92, which is defined by the right surface 83 and the cutout front surface 90, and an inner corner 93, which is defined by the cutout right surface 89 and the cutout front surface 90. In the present embodiment, the cutout front corner 91, which is formed where the front surface 81 and the cutout right surface 89 intersect each other at a right angle, corresponds to a first corner, and the left rear corner 88, which is formed where the remaining surfaces of the rear surface 82 and the left surface 84 intersect each other at a right angle, corresponds to a second corner. The cutout front corner 91 and left rear corner 88 are substantially located at diagonal positions of the battery case 80. The battery case 80 of the present embodiment includes a total of six side surfaces facing the front, rear, left, and right directions.

A front striker 29, which projects in an orthogonal direction (frontward) from the front surface 81, is arranged at the left front corner 86 of the front surface 81. Another front striker 29, which projects in an orthogonal direction (frontward) from the cutout front surface 90, is arranged on the cutout front surface 90. Further, a right striker 30 is arranged on a portion of the right surface 83 near the right rear corner 87. A left striker 31 is arranged on a portion of the left surface near the left rear corner 88. The strikers 29 to 31 have the same structure as the strikers 29 to 31 of the first embodiment. The strikers 29 form part of a battery fastening mechanism that fastens the battery case 80 to the electric automobile 10.

Although not shown, the latch mechanisms 51 to 53, which hold the strikers 29 to 31, are arranged in the vehicle body 10A. The strikers 29 to 31 and the latch mechanisms 51 to 53 correspond to the battery fastening mechanism.

A front projection 32, which serves as a case side member of a battery case guiding mechanism, is arranged on the front surface 81 near the cutout front corner 91. A right projection 33, which serves as a case side member of the battery case guiding mechanism, is arranged on a portion of the cutout right surface 89 near the cutout front corner 91. The front projection 32 and right projection 33 are projections arranged at portions near the cutout front corner 91 on the side surfaces 81 and 89. Further, a rear projection 34 is arranged on a portion of the rear surface 82 near the left rear corner 88, and a left projection 35 is arranged on a portion of the left surface near the left rear corner 88. The rear projection 34 and left projection 35 are case side members of the battery case guiding mechanism and are projections arranged at portions near the left rear corner 88 on the side surfaces 82 and 84.

Although not shown in the drawings, the guides 55 to 58, which respectively correspond to the front projection 32, right projection 33, rear projection 34, and left projection 35, are each arranged in the vehicle body 10A. The guides 55 to 58, which correspond to the projections 32 to 35, have the same structure as the guides 55 to 58 of the first embodiment. In the present embodiment, the battery case 80 is not tetragonal when viewed from above. However, the cutout front corner 91 and the left rear corner 88 are substantially located at the most separated diagonal positions in the battery case 80. Thus, the third embodiment has substantially the same advantages as the first embodiment.

Figure 10:
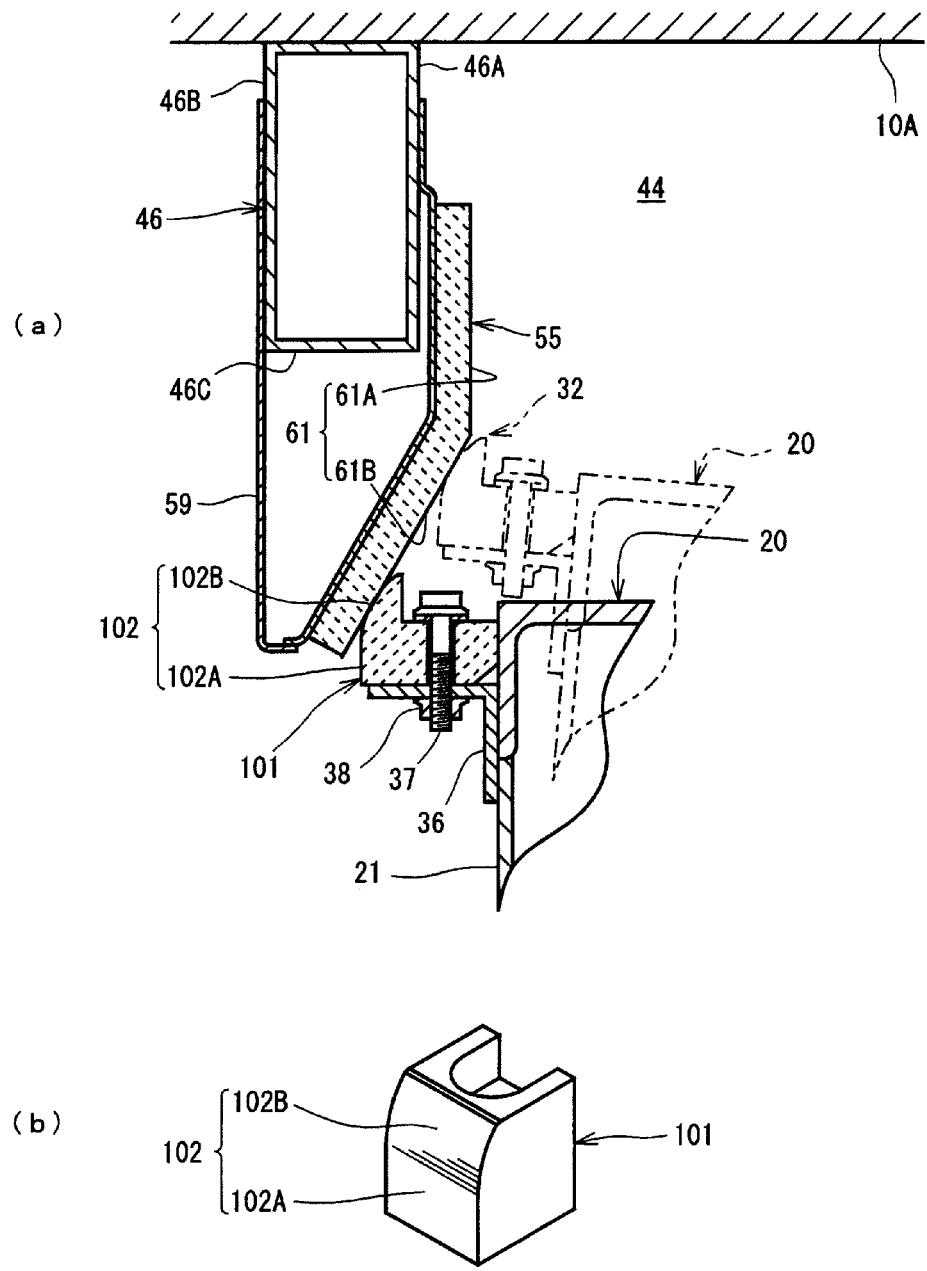
FIG. 10(a) is a partial cutaway view showing a main part of a battery guiding mechanism in a fourth embodiment of the present invention.
FIG. 10(b) is a perspective view showing a front projection in the fourth embodiment.

A battery mounting structure according to a fourth embodiment of the present invention will now be described. The present embodiment differs from the first embodiment in that the convex-curved surface of a projection serving as a vehicle body side member is formed by an arcuate surface. In the present invention, same reference numerals are given to those components that are the same as the corresponding components of the first embodiment. Such components will not be described in detail. FIG. 10(a), which is a partial cutaway view showing a main part of a battery guiding mechanism in a fourth embodiment of the present invention, shows a front projection 101 and a front guide 55, which is arranged on the inner surface of the front frame segment 46. FIG. 10(b) is a perspective view showing the front projection 101 of the present embodiment.

The front projection 101 shown in FIG. 10(a) is fixed by a bolt 37 and nut 38 to a support plate 36, which is fixed to the front surface 21 of the battery case 20 and has an L-shaped cross-section. The front projection 32 is formed from a resin. As shown in FIGS. 10(a) and 10(b), the front projection 101 includes a distal surface 102. The distal surface 102 includes a lower end surface 102A and an upper end surface 102B. The lower end surface 102A is a vertical surface, and the upper end surface 102B is formed by a convex-curved surface. The convex-curved surface is formed by an arcuate surface, and the arcuate surface has a gradient relative to the horizontal direction that becomes gradual from the lower side toward the upper side.

In the present embodiment, for example, the battery case 20 may be tilted in the front to rear direction relative to the horizontal direction. As a result, the battery case 20 is misaligned from the battery case holder 44 (as shown by the double-dashed line in FIG. 10(a)). Even if such misalignment occurs, when the battery case 20 is being raised, the convex-curved surface 102B of the front projection 101 is in line contact with the inclined surface 61B of the lower inner surface 61B of the front guide 55. When the front projection 101 slides along the inclined surface of the front guide 55 and is guided, the state of line contact between the convex-curved surface and the inclined surface basically does not change, and the sliding resistance between the front projection 101 and the front guide 55 is subtly varied. Accordingly, in the range in which the contact state of the convex-curved surface and the inclined surface does not change, the fourth embodiment has substantially the same advantages as the first embodiment.

The present invention is not limited to the above embodiment and various changes may be made with the scope of the invention.

In the first to fourth embodiments, the material forming the projections, which serve as the case members, and the guides, which serve as the vehicle body members, are each formed from a hard resin. However, the material forming the case side members and vehicle body side members is not limited to resin and may be any material satisfying the required sliding capability, wear resistance, and rust resistance. For example, the material forming the projections and guides may be a predetermined metal material having a surface coated with a fluorocarbon resin (e.g., polytetrafluoroethylene). Alternatively, the material forming the projections and guides may be a predetermined metal material having a plated surface.

In the first to fourth embodiments, each battery fastening mechanism includes strikers and latch mechanisms. However, the mechanism or means for fastening a battery to a vehicle body is not limited to strikers and latch mechanisms and only need to at least fasten and unfasten the battery to and from the vehicle body.

In the first to fourth embodiment, the four sides of the battery case extends parallel to the front, rear, left, and right sides of the electric automobile but are not necessarily limited in such a manner. That is, the side surfaces of the battery case may be inclined relative to the front, rear, left, and right sides of the electric automobile.

In the first to fourth embodiments, the distal surface of a projection includes a lower portion (or upper portion) having a vertical surface and an upper portion (or lower portion) having a convex-curved surface. However, the distal surface of the projection may include only a convex-curved surface.

In the first to fourth embodiments, the distal surface of a projection is a combination of a convex-curved surface and a curved vertical surface (or vertical surface). However, the distal surface may be formed by only a convex-curved surface.

In the first to fourth embodiments, the battery case includes four side surfaces in the front, rear, left, and right directions. However, the battery case only needs to include at least four side surfaces in the front, rear, left, and right direction. For example, in addition to the four side surfaces, the battery case may include a side surface inclined relative to the front to rear direction and the left to right direction or a side surface having an irregular shape.

DESCRIPTION OF THE REFERENCE NUMERALS

10: electric automobile, 10A: vehicle body, 11: battery replacement station, 13: opening, 14: battery replacer, 20 and 80: battery case, 21 and 81: front surface, 22 and 82: rear surface, 23 and 83: right surface, 24 and 84, left surface, 25: right front corner serving as first corner, 26 and 86: left front corner, 27 and 87: right rear corner, 28 and 88: left rear corner serving as second corner, 32 and 101: front projection serving as case side member, 33: right projection serving as case side member, 34: rear projection serving as case side member, 35: left projection serving as case side member, 39: distal surface, 39A: lower end surface, 39B: upper end surface (convex-curved surface), 40: upper portion, 44: battery case holder, 55: front guide serving as vehicle body side member, 56: right guide serving as vehicle side member, 57: rear guide serving as vehicle body member, 58: left guide serving as vehicle body side member, 61: inner surface, 61A: upper inner surface, 61B: lower inner surface (tapered surface), 71: front guide serving as case side member, 75: projection serving as vehicle body side member, 85: cutout portion, 89: cutout right surface, 90: cutout front surface, 91: cutout front corner, 92: cutout right corner, 93: inner corner.

The invention claimed is:

1. A battery mounting structure for an electric automobile, the battery mounting structure comprising:
    a battery case containing a battery cell;
    a battery case holder arranged in a vehicle body of the electric automobile, wherein the battery case holder is capable of accommodating the battery case;
    a battery fastening mechanism that fastens the battery case, which is accommodated in the battery case holder, to the vehicle body; and
    a battery case guiding mechanism that guides the battery case to the battery case holder when the battery case is raised from below the vehicle body and accommodated in the battery case holder,
    wherein the battery case includes
    four side surfaces facing front, rear, left, and right directions,
    a first corner formed by two first side surfaces, among the four side surfaces, intersecting each other at a right angle, and
    a second corner formed by two remaining second side surfaces, among the four side surfaces, intersecting each other at a right angle,
    wherein the battery case guiding mechanism includes
    a case side member arranged at a portion of each of the first side surfaces near the first corner and a portion of each of the second side surfaces near the second corner, and
    a vehicle body side member arranged on the vehicle body, wherein the vehicle body side member can contact the case side member, and
    wherein one of the case side member and the vehicle side member includes a convex-curved surface, and the other one of the case side member and the vehicle side member includes an inclined surface that can contact the convex-curved surface.

2. The battery mounting structure according to claim 1, wherein the convex-curved surface is formed by a spherical surface.

3. The battery mounting structure according to claim 1, wherein the convex-curved surface is formed by an arcuate surface.

4. The battery mounting structure according to claim 1, wherein
    the battery case is tetragonal when viewed from above, and the first corner and the second corner are located at diagonal positions.

* * * * *